(12) United States Patent
Asper

(10) Patent No.: US 12,227,030 B2
(45) Date of Patent: Feb. 18, 2025

(54) TIRE HAVING CIRCUMFERENTIAL TREAD WITH REINFORCED RIBS

(71) Applicant: Bridgestone Americas Tire Operations, LLC, Nashville, TN (US)

(72) Inventor: Robert W. Asper, Wadsworth, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 890 days.

(21) Appl. No.: 17/273,153

(22) PCT Filed: Oct. 7, 2019

(86) PCT No.: PCT/US2019/054936
§ 371 (c)(1),
(2) Date: Mar. 3, 2021

(87) PCT Pub. No.: WO2020/076671
PCT Pub. Date: Apr. 16, 2020

(65) Prior Publication Data
US 2021/0316573 A1 Oct. 14, 2021

Related U.S. Application Data

(60) Provisional application No. 62/743,085, filed on Oct. 9, 2018.

(51) Int. Cl.
*B60C 11/00* (2006.01)
*B60C 9/00* (2006.01)
(Continued)

(52) U.S. Cl.
CPC .......... *B60C 11/005* (2013.01); *B60C 9/0007* (2013.01); *B60C 9/0042* (2013.01);
(Continued)

(58) Field of Classification Search
CPC ... B60C 11/005; B60C 11/00; B60C 11/0008; B60C 11/0041; B60C 2011/0025;
(Continued)

(56) References Cited

U.S. PATENT DOCUMENTS 2,943,663 A 7/1960 Antonson
4,244,415 A 1/1981 Peter et al.
(Continued)

FOREIGN PATENT DOCUMENTS

EP 1554135 3/2009
FR 3035616 11/2016
(Continued)

OTHER PUBLICATIONS

Written Opinion and international search report; Corresponding PCT application PCT/US2019/054936: Authorized officer Hwang, Chan Yoon: Date of mailing Jan. 31, 2020.
(Continued)

*Primary Examiner* — Justin R Fischer
*Assistant Examiner* — Philip N Schwartz
(74) *Attorney, Agent, or Firm* — Shaun J. Fox; Bryan J. Jaketic

(57) ABSTRACT

A pneumatic tire includes a pair of sidewalls, a pair of bead portions, and a circumferential tread having a plurality of circumferential ribs and a plurality of circumferential grooves. A reinforcing layer is disposed in at least one of the plurality of circumferential ribs. No part of the reinforcing layer extends directly below a bottom surface of any of the plurality of circumferential grooves. The reinforcing layer has a consistent gauge along its entire lateral width. A top surface of the reinforcing layer is located radially higher than the bottom surface of each of the plurality of circumferential grooves.

8 Claims, 3 Drawing Sheets

(51) Int. Cl.
*B60C 9/18* (2006.01)
*B60C 11/03* (2006.01)

(52) U.S. Cl.
CPC ............ *B60C 11/0008* (2013.01); *B60C 9/18* (2013.01); *B60C 2011/0025* (2013.01); *B60C 2011/0355* (2013.01); *B60C 2011/0386* (2013.01)

(58) Field of Classification Search
CPC ..... B60C 2011/0355; B60C 2011/0386; B60C 9/007; B60C 9/0042; B60C 9/18; B60C 2009/2064
See application file for complete search history.

(56) References Cited

U.S. PATENT DOCUMENTS

| | | | |
|---|---|---|---|
| 5,228,933 | A | 7/1993 | Kawabata et al. |
| 5,253,691 | A * | 10/1993 | Scriver ................... C08L 21/00 152/564 |
| 2005/0039834 | A1 | 2/2005 | Suzuki |
| 2011/0198006 | A1 * | 8/2011 | Asayama ............. B60C 9/2204 152/209.18 |
| 2015/0328936 | A1 | 11/2015 | Colby et al. |
| 2016/0167440 | A1 | 6/2016 | Schweitzer et al. |
| 2016/0207357 | A1 | 7/2016 | Guillaume et al. |
| 2016/0288576 | A1 | 10/2016 | Romero et al. |

FOREIGN PATENT DOCUMENTS

| | | |
|---|---|---|
| GB | 2008042 | 5/1979 |
| JP | 04306103 | 10/1992 |
| JP | 2006103397 | 4/2006 |
| JP | 2006199073 | 8/2006 |
| JP | 2011037415 | 2/2011 |
| JP | 4872273 | 2/2012 |
| JP | 2012196983 | 10/2012 |
| JP | 2015081010 | 4/2015 |
| JP | 6014043 | 10/2016 |
| KR | 20090050338 | 5/2009 |
| KR | 10-1302551 | 4/2013 |
| KR | 1486749 | 1/2015 |
| WO | 2017116382 | 7/2017 |
| WO | 2018002487 | 1/2018 |
| WO | 2018109323 | 6/2018 |

OTHER PUBLICATIONS

Search Report; Corresponding EP Application Serial No. 19871700; May 23, 2022.

* cited by examiner

TIRE HAVING CIRCUMFERENTIAL TREAD WITH REINFORCED RIBS

FIELD OF INVENTION

This disclosure relates to the field of pneumatic tires. More particularly, this disclosure relates to the field of pneumatic tires having a circumferential tread with tread reinforcing layers.

BACKGROUND

Pneumatic tires are known to have a circumferential tread that has a variety of grooves and a variety of materials. One or more layers of belts, reinforcement plies, cap plies, and subtreads may be disposed beneath the tread. Such layers may extend axially beneath the entire tread. Modifying the configuration of the grooves and the materials will impact various properties of the tire such as stiffness and wet performance.

SUMMARY OF THE INVENTION

In one embodiment, a pneumatic tire includes a pair of sidewalls and a pair of bead portions. The tire further includes a circumferential tread having a plurality of circumferential ribs and a plurality of circumferential grooves, including a first circumferential rib having a first rib width defined by a first circumferential groove and one of a second circumferential groove and a tread edge. The first circumferential rib includes a reinforcing layer having a width less than the first rib width, such that the reinforcing layer is enclosed by the first circumferential rib. The reinforcing layer has a consistent gauge along its entire lateral width. A top surface of the reinforcing layer is located radially higher than a bottom of the first circumferential groove.

In another embodiment, a pneumatic tire includes a pair of sidewalls, a pair of bead portions, and a circumferential tread having a plurality of circumferential ribs and a plurality of circumferential grooves. A reinforcing layer is disposed in at least one of the plurality of circumferential ribs. No part of the reinforcing layer extends directly below a bottom surface of any of the plurality of circumferential grooves. The reinforcing layer has a consistent gauge along its entire lateral width. A top surface of the reinforcing layer is located radially higher than the bottom surface of each of the plurality of circumferential grooves.

In yet another embodiment, a pneumatic tire includes a pair of sidewalls and a pair of bead portions. The pneumatic tire further includes a circumferential tread having a plurality of circumferential ribs and a plurality of circumferential grooves, including a first circumferential rib having a first rib width defined by a first circumferential groove and one of a second circumferential groove and a tread edge. The first circumferential rib includes a reinforcing layer having a width less than the first rib width, such that the reinforcing layer is enclosed by the first circumferential rib. The reinforcing layer includes a reinforcing cord. A top surface of the reinforcing layer is located radially higher than a bottom of the first circumferential groove and radially higher than a bottom of the second circumferential groove.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Tread" as used herein, refers to that portion of the tire that comes into contact with the road or ground under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it is understood that because the terms carry slightly different connotations, one of ordinary skill in the art would not consider any one of the following terms to be purely interchangeable with another term used to describe a common tire component.

Figure 1:
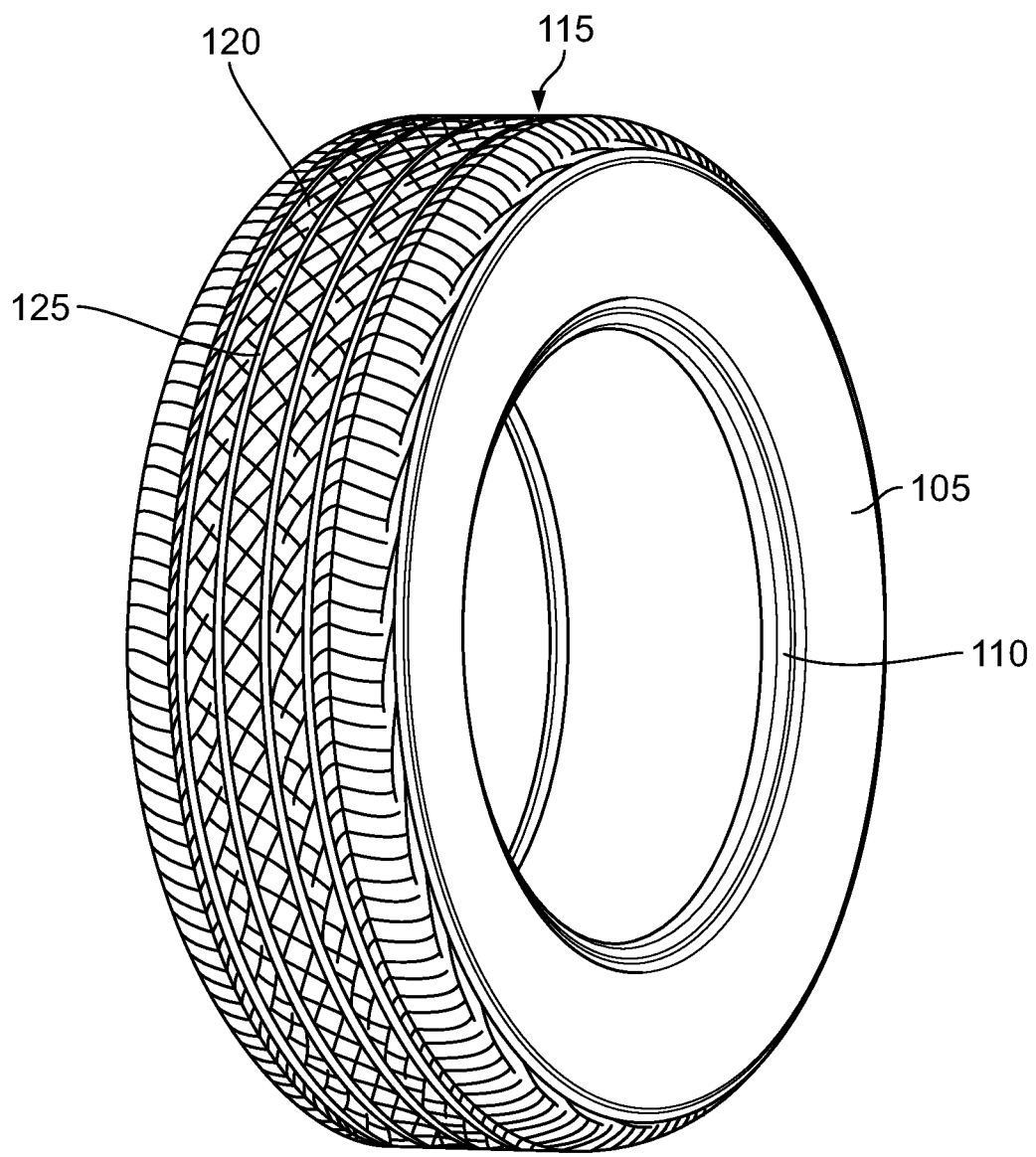
FIG. 1 is a perspective view of one embodiment of a tire 100.

FIG. 1 illustrates a perspective view of one embodiment of a tire 100. The tire has a pair of sidewalls 105, a pair of bead portions 110, and a circumferential tread 115. The sidewall 105 may include a sidewall rubber. The circumferential tread may be formed of tread rubber. In one embodiment, the sidewall rubber and tread rubber are different materials. In an alternative embodiment, the sidewall rubber is the same material as the tread rubber.

The circumferential tread has a plurality of circumferential ribs 120 defined by a plurality of circumferential grooves 125. While five ribs are shown in the illustrated embodiment, it should be understood that any number of ribs may be employed. In the illustrated embodiment, the tire 100 is a pneumatic tire configured for use on a passenger vehicle. In alternative embodiments, the tire may be configured for use on a truck vehicle. Additionally, the tire may be a run-flat tire.

In the illustrated embodiment, each circumferential rib includes a plurality of lateral grooves that divide the rib into blocks. In an alternative embodiment (not shown), one or more of the circumferential ribs is a circumferentially continuous tread element. Any of the above-described tread elements may contain one or more sipes, with or without lateral grooves.

In the illustrated embodiment, the circumferential groove extends straight to the circumferential direction. However, the circumferential grooves may be a wavy or zigzagged circumferential groove.

Figure 2:
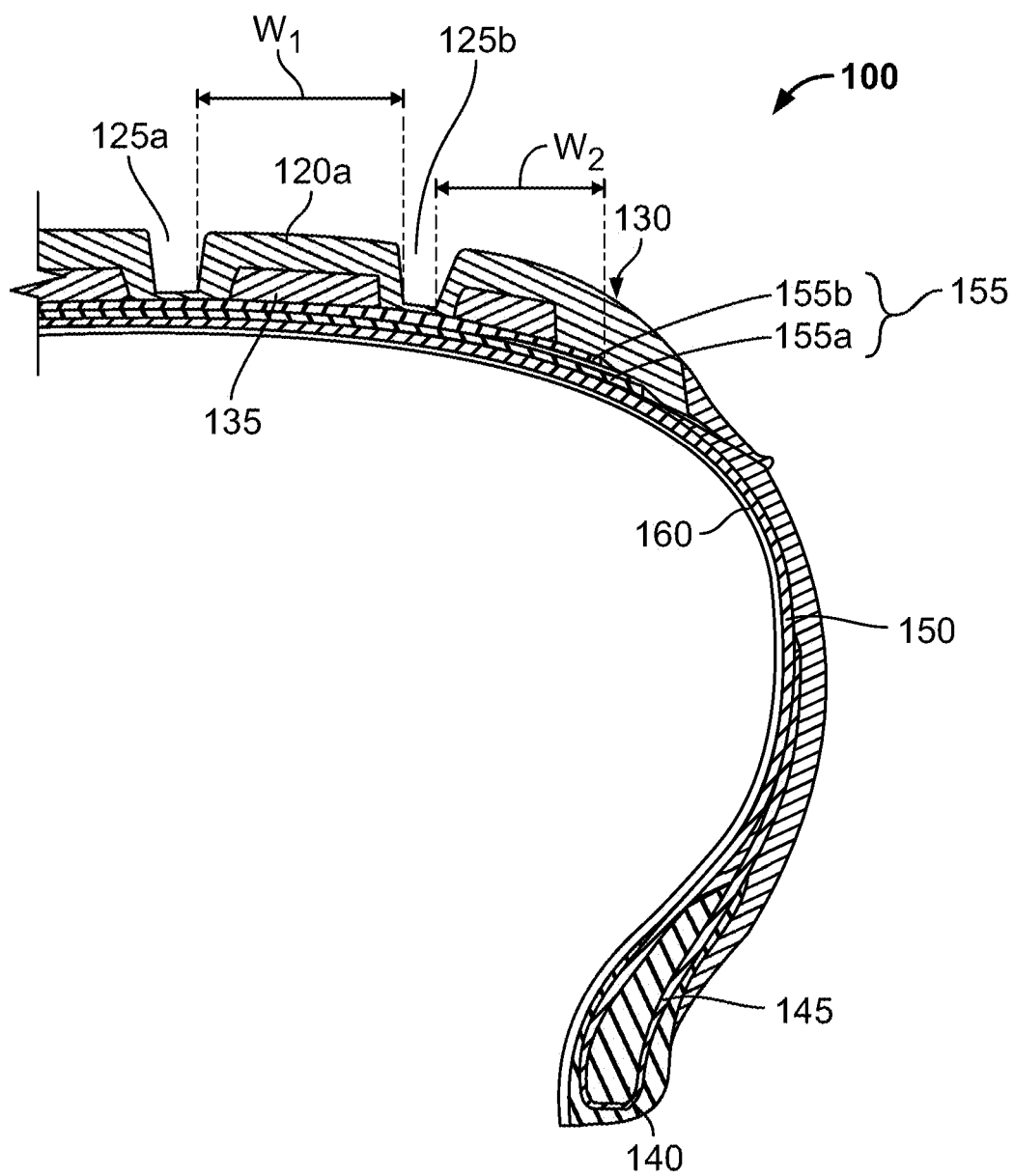
FIG. 2 is a widthwise cross-sectional view of a quarter section of the tire 100.

FIG. 2 illustrates a widthwise cross-sectional view of a quarter section of the tire 100. As can be seen in this figure, each rib 120 is defined by either a pair of circumferential grooves 125, or by a circumferential groove 125 and a tread edge 130. For example, a first circumferential rib 120a has a first rib width $W_1$ defined by a first circumferential groove 125a and a second circumferential groove 125b. Additionally, a second circumferential rib 120b has a second rib width W2 defined by the second circumferential groove 125b and a tread edge 130. While rib 120a is referred to as a "first" circumferential rib and rib 120b is referred to as a "second" circumferential rib here, it should be understood that these references are merely used for convenience in describing the illustration. Such designation is arbitrary, and any one of the circumferential ribs may be designated as a "first" rib or a "second" rib. Likewise, any groove may be designated as a "first" groove or a "second" groove.

The first circumferential rib 125a includes a reinforcing layer 135. In the illustrated embodiment, each of the circumferential ribs of 120 the tire 100 includes a separate reinforcing layer 135. However, it should be understood that the tire may include a reinforcing layer in only some of the circumferential ribs, or even in only one circumferential rib. For example, in one alternative embodiment (not shown) a reinforcing layer is included only in circumferential ribs defined by two circumferential grooves, while circumferential ribs defined by a circumferential groove and a tread edge (i.e., shoulder ribs) do not include a reinforcing layer.

Additional tire components are shown in the illustrated embodiment of tire 100. It should be understood, however, that tire 100 is merely exemplary, and that these additional components may be omitted or replaced with other known tire components. For example, FIG. 2 shows that the tire 100 includes a bead core 140 in each bead portion 110. A bead filler 145 is disposed radially above the bead core 140. A carcass ply 150 extends from one bead core to another. The carcass ply 150 may be a radial carcass or a bias carcass. The carcass ply 150 may include a carcass cord made of an organic cord or a steel cord.

A belt 155 is disposed radially above the carcass ply 150 and in the tread portion. In the illustrated embodiment, the belt 155 has two belt layers including a radially inner belt 155a and a radially outer belt layer 155b. In alternative embodiments (not shown), the belt may include a belt single layer or three or more belt layers.

The belt 155 includes steel cords that extend at an angle relative to the circumferential direction. In one embodiment, the steel belt cords of the radially inner belt 155a and the steel belt cords of the radially outer belt 155b are inclined in opposite directions relative to the circumferential direction. In such an embodiment, the belt layers may be described as forming intersecting belt layers.

An inner-liner 160 is disposed on an inner surface of the tire 100. The inner-liner 160 extends from one bead portion 110 to the other bead portion. In an alternative embodiment (not shown), the inner-liner may be omitted.

In the illustrated embodiment, the tire 100 lacks a cap layer. Cap layers are known to contain a circumferentially extending cord and may cover substantially the entire width of a belt. However, in alternative embodiments, the tire may include such a cap layer.

Figure 3A:
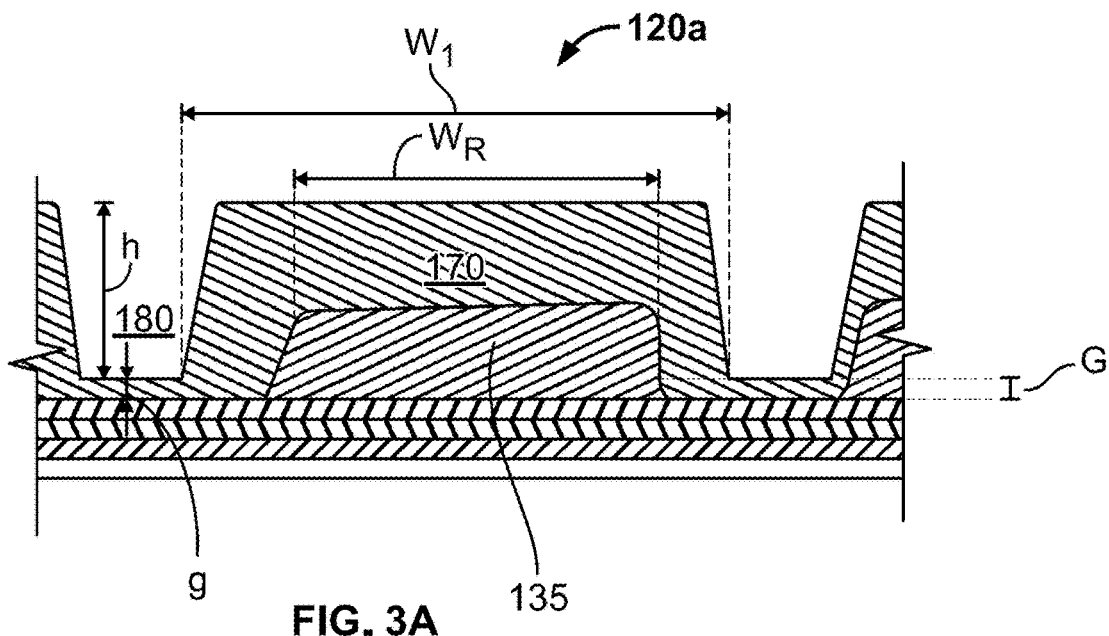
FIG. 3A is a partial widthwise cross-sectional view of the tire 100, illustrating a first circumferential rib and a reinforcing layer.

FIG. 3A illustrates a close-up view of the first circumferential rib 120a. In the specific embodiment illustrated in FIG. 3A, the reinforcing layer 135 has a width $W_R$ that is less than the first rib width $W_1$. Thus, the reinforcing layer 135 is enclosed by the first circumferential rib 120a. While the reinforcing layer 135 is shown as being substantially centered within the first circumferential rib 120, in alternative embodiments, the reinforcing layer may be skewed to the right or left. In another alternative embodiment (not shown), the reinforcing layer may undulate within the rib in the circumferential direction, so that it is centered at some locations, skewed to left at some locations, and skewed to the right at other locations.

In the illustrated embodiment, the reinforcing layer 135 has the same gauge G along its entire lateral width. A top surface of the reinforcing layer is located radially higher than a bottom of the first circumferential groove due to the curvature of the tread. Additionally, the reinforcing layer 135 has the same gauge G along its entire circumferential length. In alternative embodiments (not shown), the gauge G of the reinforcement varies in the lateral or circumferential direction.

As can be further seen in FIG. 3A, no part of the reinforcing layer extends directly below a bottom surface of any of the plurality of circumferential grooves. A top surface 170 of the reinforcing layer is located radially higher than the bottom surface 180 of each of the plurality of circumferential grooves. In an alternative embodiment (not shown), the top surface of the reinforcing layer may be lower than the bottom surface of the circumferential groove.

In the illustrated embodiment, no part of the reinforcing layer forms a groove wall surface of any of the plurality of the circumferential grooves. In this specific embodiment, no part of the reinforcing layer forms a radially outer surface of any of the plurality of the circumferential ribs. In an alternative embodiment (not shown), a portion of the reinforcing layer may form a radially outer surface of at least one of the circumferential ribs. For example, the reinforcing layer may become exposed as the tread wears.

In one embodiment, the reinforcing layer includes a reinforcing cord. The reinforcing cord can be a circumferentially extended cord. The reinforcing cord may be an organic cord, for example a nylon cord, or a metal cord, for example a steel cord. In one particular embodiment, the reinforcing cords are limited to the reinforcing layer, and no reinforcing cords (i.e., no organic cords) are disposed radially between the carcass and the bottom surfaces of the plurality of the circumferential grooves.

In one embodiment, the reinforcing layer includes a matrix rubber embedding the reinforcing cord. A tread rubber disposed radially above the reinforcing layer is a different rubber material from the matrix rubber. The matrix rubber may have a higher modulus than that of the tread rubber. Alternatively, the matrix rubber may have a lower modulus than that of the tread rubber.

The tread rubber forms the bottoms of the plurality of the circumferential grooves. In one embodiment, the tread rubber is made of a single rubber material. Alternatively, the tread rubber may include multiple rubber layers made of different rubber materials.

In the illustrated embodiment, the reinforcing layer is disposed immediately above the belt, such that no other material is disposed radially between the belt and the reinforcing layer.

The use of the reinforcements allows for the creations of ribs having a groove depth that is greater than the gauge of the tread material. In the illustrated embodiment, a gauge G between the belt and the bottom of the circumferential groove is in the range of 2 mm to 20 mm. In one particular embodiment, the gauge is between 2 mm and 5 mm. The region radially between the belt and the bottom of the circumferential groove consists of rubber. A groove depth h of any of the plurality of the circumferential grooves is in the range of 3 mm to 25 mm. In one particular embodiment, the groove depth is in the range of 3 mm to 10 mm. In one exemplary embodiment, the gauge is 4 mm and the tread depth is 6 mm.

Figure 3B:
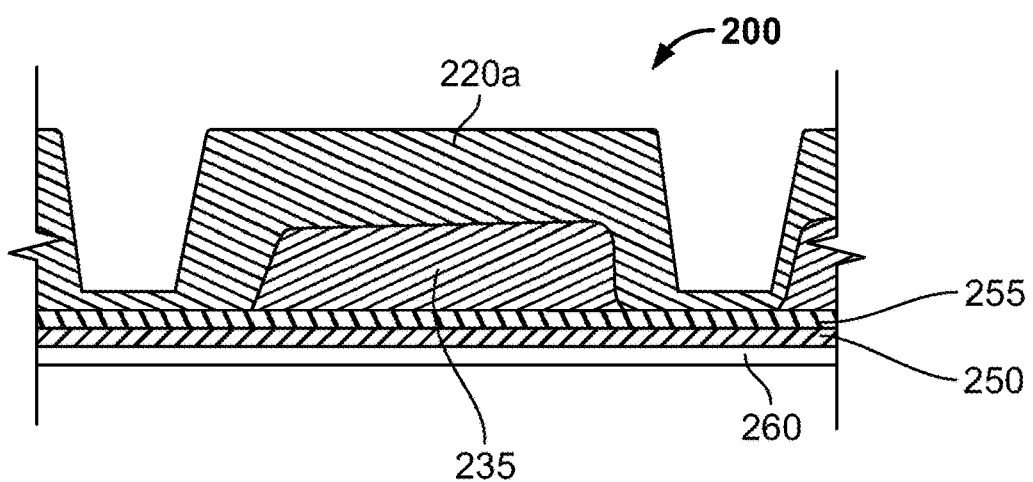
FIG. 3B is a partial cross-sectional view of an alternative embodiment of a tire 200, illustrating a first circumferential rib and a reinforcing layer.

FIG. 3B is a partial cross-sectional view of an alternative embodiment of a tire 200, illustrating a first circumferential rib and a reinforcing layer. The tire 200 is substantially the same as the tire 100 shown in FIGS. 1, 2, and 3A and discussed above (including the alternative embodiments discussed above), except for the differences described herein.

In the illustrated embodiment, a circumferential rib 220a is shown having a reinforcing layer 235. The tire 200 includes a carcass ply 250, a belt 255 and an inner liner 260. Unlike the belt 155 of the tire 100, the belt 255 of the tire 200 consists of a single belt layer.

Figure 3C:
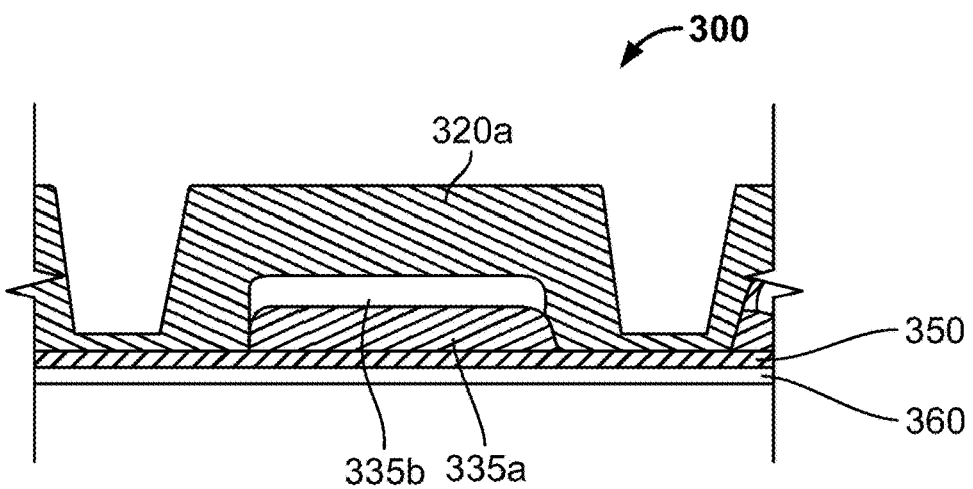
FIG. 3C is a partial cross-sectional view of another alternative embodiment of a tire 300, illustrating a first circumferential rib and a reinforcing layer.

FIG. 3C is a partial cross-sectional view of another alternative embodiment of a tire 300, illustrating a first circumferential rib and a reinforcing layer. The tire 300 is substantially the same as the tires 100 and 200 shown in FIGS. 1, 2, 3A, and 3B and discussed above (including the alternative embodiments discussed above), except for the differences described herein.

In the illustrated embodiment, a circumferential rib 320a is shown having a reinforcing layer 335. The reinforcing layer 335, is composed of two sub-layers. A first sub-layer 335a is disposed immediately radially above a carcass ply 350 and a second sublayer 335b is disposed immediately radially above the first sub-layer 335a and radially below a tread rubber. In this embodiment, the tire 300 includes an inner liner 360, but does not include a belt. Instead, the reinforcing sub-layers 335a,b perform the function of a belt.

While the two sub-layers are shown as having approximately the same gauges and same widths, the two sub-layers may have different gauges or different widths. The two sub-layers may have various combination of their materials or properties. For example, in the case that both of the sub-layers 335a,b include reinforcing cords embedded in matrix rubbers, two sub-layers may have different reinforcing cord materials, different cord properties and/or different matrix rubbers. Only one of the sub-layers may include a reinforcing cords embedded in matrix rubber. In an alternative embodiment (not shown), a reinforcing layer includes three or more sub-layers.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

What is claimed is:

1. A pneumatic tire comprising:
   a pair of sidewalls;
   a pair of bead portions;
   a carcass ply extending between the pair of bead portions;
   a circumferential tread having a plurality of circumferential ribs and a plurality of circumferential grooves, including a first circumferential rib having a first rib width defined by a first circumferential groove and one of a second circumferential groove and a tread edge,
      wherein the first circumferential rib includes a reinforcing layer having a width less than the first rib width, such that the reinforcing layer is enclosed by the first circumferential rib,
      wherein the reinforcing layer includes multiple sub-layers, including a first sub-layer of reinforcing organic cords and a second sub-layer of reinforcing steel cords, and
      wherein a top surface of the reinforcing layer is located radially higher than a bottom of the first circumferential groove and radially higher than a bottom of the second circumferential groove; and
   a single belt ply disposed between the carcass ply and the circumferential tread.

2. The pneumatic tire of claim 1, wherein the reinforcing organic cord is a circumferentially extending cord.

3. The pneumatic tire of claim 1, wherein a material of the reinforcing organic cord is nylon.

4. The pneumatic tire of claim 1, wherein the first circumferential rib includes tread rubber disposed directly above the reinforcing layer,
   wherein the reinforcing layer further includes a matrix rubber embedding the reinforcing cord, and
   wherein the tread rubber and the matrix rubber are different rubber materials.

5. The pneumatic tire of claim 4, wherein the matrix rubber has a higher modulus than that of the tread rubber.

6. The pneumatic tire of claim 4, wherein the tread rubber further forms the bottoms of the plurality of circumferential grooves, and wherein the tread rubber is made of a single rubber material.

7. The pneumatic tire of claim 1, wherein the first circumferential groove has a groove depth between 3 mm and 25 mm, and wherein a gauge between the single belt ply and the bottom of the first circumferential groove is between 2 mm and 20 mm.

8. The pneumatic tire of claim 1, wherein the first circumferential groove has a groove depth between 3 mm and 10 mm, and wherein a gauge between the single belt ply and the bottom of the first circumferential groove is between 4 mm and 6 mm.

* * * * *